United States Patent
Chen et al.

(10) Patent No.: US 7,600,775 B2
(45) Date of Patent: Oct. 13, 2009

(54) STROLLER CONNECTABLE WITH A CAR SEAT

(75) Inventors: Shun-Min Chen, Taipei (TW); Jian-Qun Li, Taipei (TW); Haibo Zeng, Taipei (TW)

(73) Assignee: Wonderland Nurserygoods Co., Ltd. (TW)

( * ) Notice: Subject to any disclaimer, the term of this patent is extended or adjusted under 35 U.S.C. 154(b) by 174 days.

(21) Appl. No.: 11/746,334

(22) Filed: May 9, 2007

(65) Prior Publication Data

US 2008/0157491 A1 Jul. 3, 2008

(30) Foreign Application Priority Data

Dec. 28, 2006 (CN) .................... 2006 2 0166482 U

(51) Int. Cl.
*B62B 1/00* (2006.01)
(52) U.S. Cl. .................... 280/650; 280/642; 297/256.16
(58) Field of Classification Search ................. 280/642, 280/651, 643, 650, 647, 648, 47.38; 297/130, 297/256.16, 183.2
See application file for complete search history.

(56) References Cited

U.S. PATENT DOCUMENTS

| | | | |
|---|---|---|---|
| 5,676,386 A * | 10/1997 | Huang ..................... 280/47.38 |
| 5,788,604 A * | 8/1998 | Brown et al. ................. 280/642 |
| 5,947,555 A | 9/1999 | Welsh, Jr. et al. ............ 297/130 |
| 6,070,890 A | 6/2000 | Haut et al. ................ 280/47.38 |
| 6,409,205 B1 * | 6/2002 | Bapst et al. .................. 280/642 |
| 6,572,134 B2 * | 6/2003 | Barrett et al. ................ 280/650 |
| 6,626,452 B2 * | 9/2003 | Yang et al. ................... 280/643 |
| 6,666,473 B2 * | 12/2003 | Hartenstine et al. ......... 280/647 |
| 6,893,040 B2 * | 5/2005 | Hou et al. .................... 280/642 |
| 6,923,467 B2 * | 8/2005 | Hsia ........................... 280/642 |
| 7,017,921 B2 * | 3/2006 | Eros ......................... 280/47.38 |
| 7,040,694 B2 * | 5/2006 | Sedlack ....................... 297/130 |
| 7,070,197 B2 * | 7/2006 | Chen ........................... 280/642 |
| 7,278,652 B2 * | 10/2007 | Riedl et al. .................. 280/642 |
| 7,445,229 B2 * | 11/2008 | Dotsey et al. ............... 280/642 |
| 2004/0124611 A1 | 7/2004 | Gong et al. ................. 280/642 |

\* cited by examiner

*Primary Examiner*—Hau V Phan
(74) *Attorney, Agent, or Firm*—Ostrolenk Faber LLP

(57) ABSTRACT

A stroller connectable with a car seat and includes a stroller frame, a seat portion on the stroller frame and formed with a generally horizontal seat plate, and a footrest disposed pivotally on the seat plate and having a coupling portion. The footrest is pivotable relative to the seat plate between first and second positions. When the footrest is in the first position it stands on the seat plate such that the retaining member engages the coupling portion to thereby retain the car seat on the stroller.

21 Claims, 7 Drawing Sheets

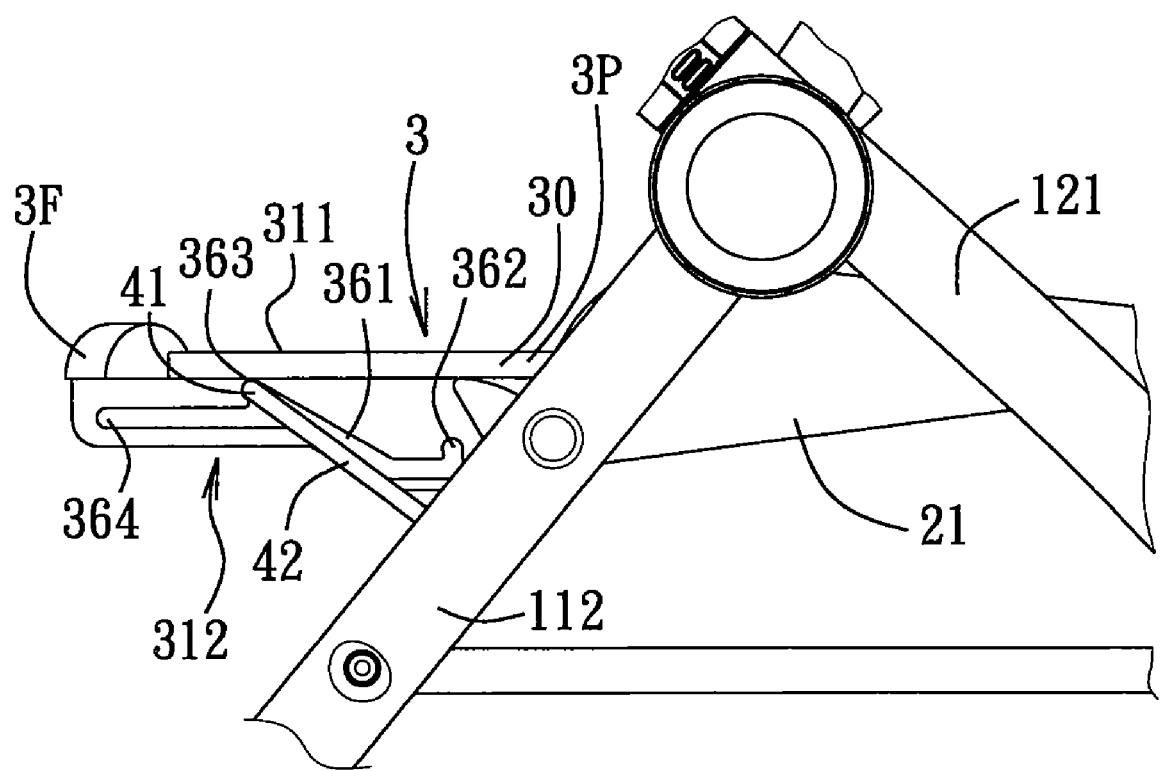
F I G. 6

STROLLER CONNECTABLE WITH A CAR SEAT

CROSS-REFERENCE TO RELATED APPLICATION

This application claims priority of Taiwanese Application No. 200620166482.9, filed on Dec. 28, 2006.

BACKGROUND OF THE INVENTION

1. Field of the Invention

This invention relates to a stroller, and more particularly to a stroller connectable with a car seat.

2. Description of the Related Art

Current trends in stroller design are such that a specific portion of the stroller is made to allow a car seat to be connected therewith. Such a design can be found in U.S. Pat. Nos. 6,070,890, 5,947,555, and 6,572,134, and UP Patent Application Publication No. 2004/0124611.

In U.S. Pat. No. 6,070,890, a stroller is connected with a car seat by a tray. In UP Patent Application Publication No. 2004/0124611, a stroller is connected with a car seat by a pair of supporting rods. In U.S. Pat. No. 5,947,555, a stroller is connected with a car seat by two armrests.

SUMMARY OF THE INVENTION

The object of this invention is to provide a stroller that can be connected with a car seat by a footrest.

According to an aspect of this invention, a stroller is adapted to be connected with a car seat. The car seat includes a retaining member. The stroller comprises:

a stroller frame;

a seat portion disposed on the stroller frame and formed with a generally horizontal seat plate;

a footrest disposed pivotally on the seat plate and having a coupling portion, the footrest being pivotable relative to the seat plate between first and second positions, the footrest standing on the seat plate such that the retaining member engages the coupling portion to thereby retain the car seat on the stroller when the footrest is disposed in the first position.

According to another aspect of this invention, a stroller assembly comprises:

a car seat including a seat body having a bottom portion formed with a retaining member; and a stroller including a stroller frame, a seat portion disposed on the stroller frame and formed with a generally horizontal seat plate, and a footrest disposed pivotally on the seat plate and having a coupling portion, the footrest being pivotable relative to the seat plate between first and second positions, the footrest standing on the seat plate such that the retaining member engages the coupling portion to thereby retain the car seat on the stroller when the footrest is disposed in the first position.

BRIEF DESCRIPTION OF THE DRAWINGS

These and other features and advantages of this invention will become apparent in the following detailed description of a preferred embodiment of this invention, with reference to the accompanying drawings, in which:

FIG. 6 is a fragmentary perspective view of the preferred embodiment when the footrest is disposed in the second position.

DETAILED DESCRIPTION OF THE PREFERRED EMBODIMENT

Figure 1:
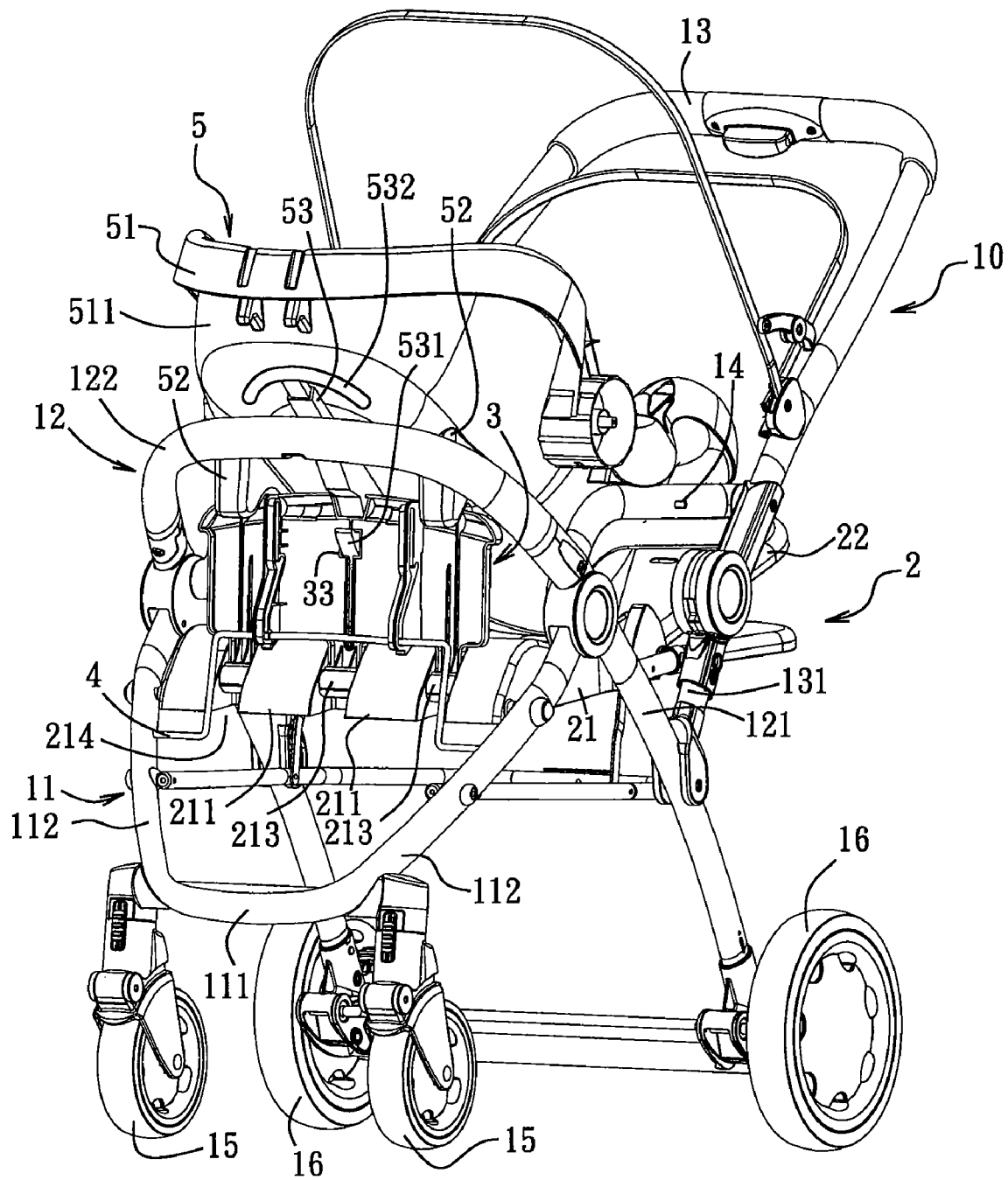
FIG. 1 is a perspective view of the preferred embodiment of a stroller assembly according to this invention.
Figure 2:
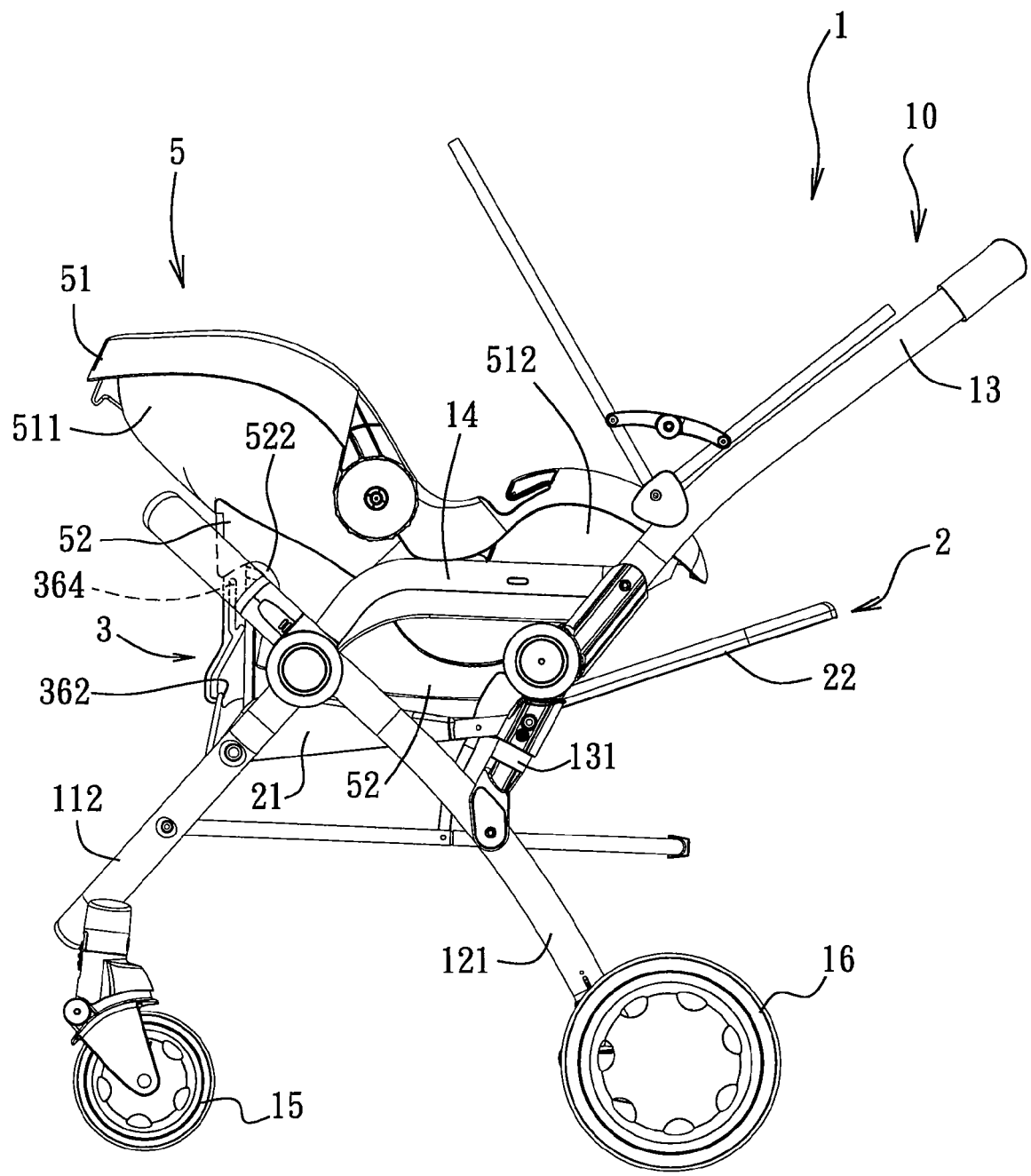
FIG. 2 is a side view of the first preferred embodiment when a footrest is disposed in a first position.

Referring to FIGS. 1 and 2, the preferred embodiment of a stroller assembly 1 according to this invention includes a stroller and a car seat 5. The stroller includes a foldable stroller frame 10, a seat portion 2 disposed on the stroller frame 10, a footrest 3, and a supporting rod 4. The foldable stroller frame 10 includes a front leg frame 11, a rear leg frame 12, a back frame 13, two armrests 14, a pair of front wheels 15, and a pair of rear wheels 16.

The car seat 5 includes a seat body 51 that has a backrest portion 511 and a seat portion 512. The backrest portion 411 includes a hollow middle ridge wall 53 and two side ridge walls 52 flanking the middle ridge wall 53. The middle ridge wall 53 includes a retaining member 531 that is biased to project downwardly from a bottom end thereof (i.e., the retaining member 531 is disposed on a bottom portion of the seat body 51), and that is configured as a projecting block, and an actuator 532 is disposed movably at an upper end of the middle ridge wall 53 and operable to move the retaining member 531 relative to the middle ridge wall 52 between an engagement position and a disengagement position. Each of the side walls 52 has a concave portion 522 aligned horizontally with the retaining member 531.

The front leg frame 11 is generally U-shaped, and includes a front leg rail 111 and two front leg side rods 112 connected respectively to two ends of the front leg rail 111. The front wheels 15 are disposed respectively on bottom ends of the front leg side rods 112. The rear leg frame 12 includes two rear leg side rods 121 connected respectively and pivotally to top ends of the front leg side rods 112, and a protective rail 122 interconnecting fixedly top ends of the rear leg side rods 121. The protective rail 122 may be replaced with a food tray (not shown). Alternatively, the protective rail 122 may be connected removably to the rear leg side rods 121. The rear wheels 16 are disposed respectively on bottom ends of the rear leg side rods 121. The back frame 13 is inverted U-shaped, and has two bottom ends connected respectively and pivotally to two rear leg connecting rods 131 that are connected respectively and pivotally to the rear leg side rods 121 at bottom ends thereof. The armrests 14 have front ends connected respectively and pivotally to top ends of the rear leg side rods 121, and rear ends connected respectively and pivotally to two sides of the back frame 13.

The seat portion 2 includes a generally horizontal seat plate 21 and a back plate 22. The seat plate 21 is disposed between the front leg side rods 112 and between the rear leg side rods 121. The back plate 22 is connected pivotally to a rear side of the seat plate 21. When the stroller is not mounted with the car seat 5, the back plate 22 is pivotable between a horizontal position whereat a baby can lie on the seat plate 21 and the back plate 22, and a vertical position whereat the baby can sit upright on the seat plate 21 and lean back against the back plate 22. The back plate 22 is also pivotable to an inclined position shown in FIG. 2 so as to enable the car seat 5 to be mounted on the stroller frame 10. A front end of the seat plate 21 is formed with a plurality of spaced-apart protrusions 211, two outmost ones of which are connected respectively and pivotally to the front leg side rods 112. Each of the protrusions 211 has an inclined top surface. Each adjacent pair of the protrusions 211 is interconnected by a connecting section 213, and defines a lug-accommodating space 214 therebetween. The footrest 3 can pivot about the connecting sections 213 among a first position shown in FIG. 1, a second position shown in FIG. 5, and a third position shown in FIG. 7.

Figure 3:
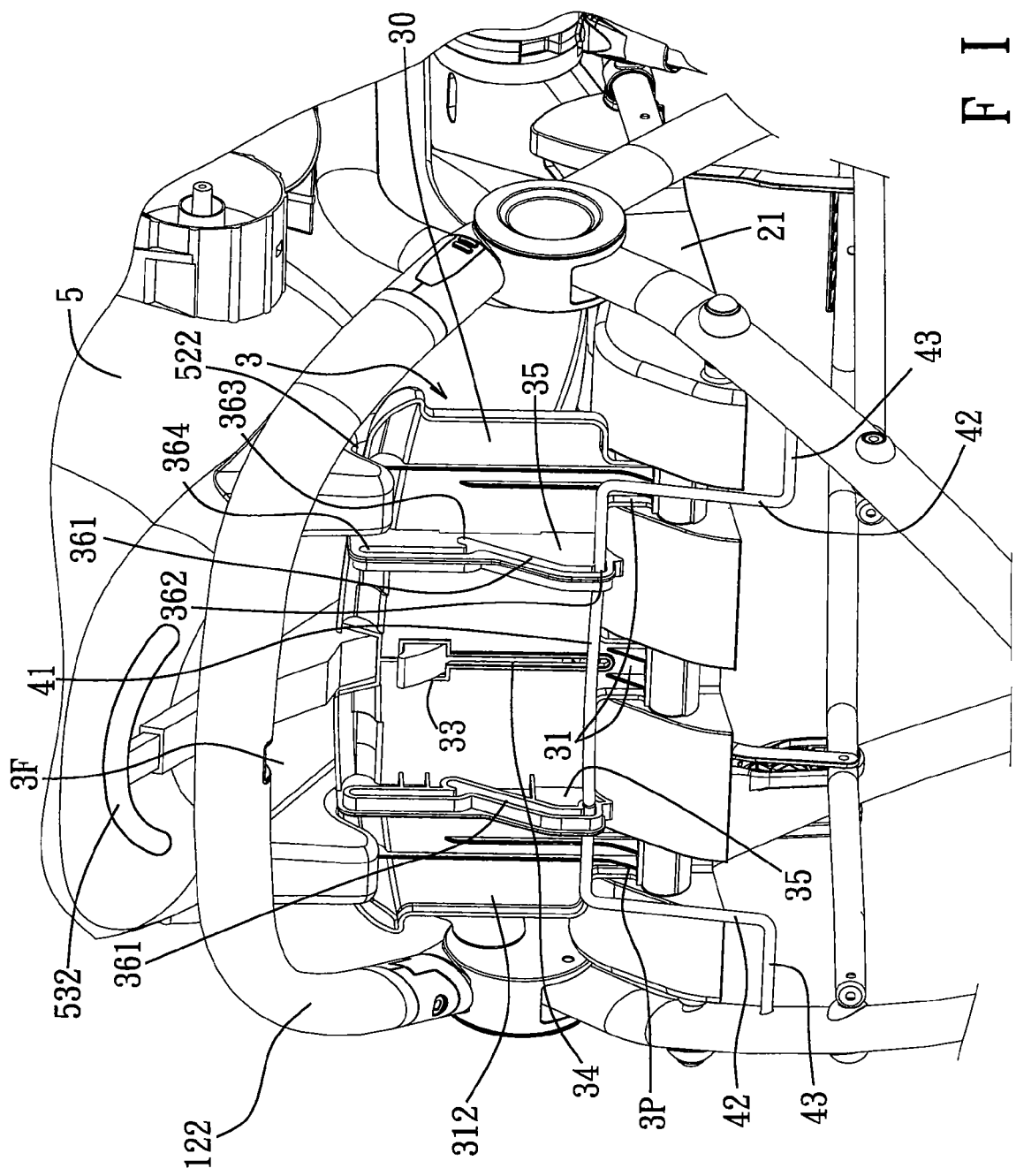
FIG. 3 is a fragmentary perspective view of the preferred embodiment when the footrest is disposed in the first position.
Figure 4:
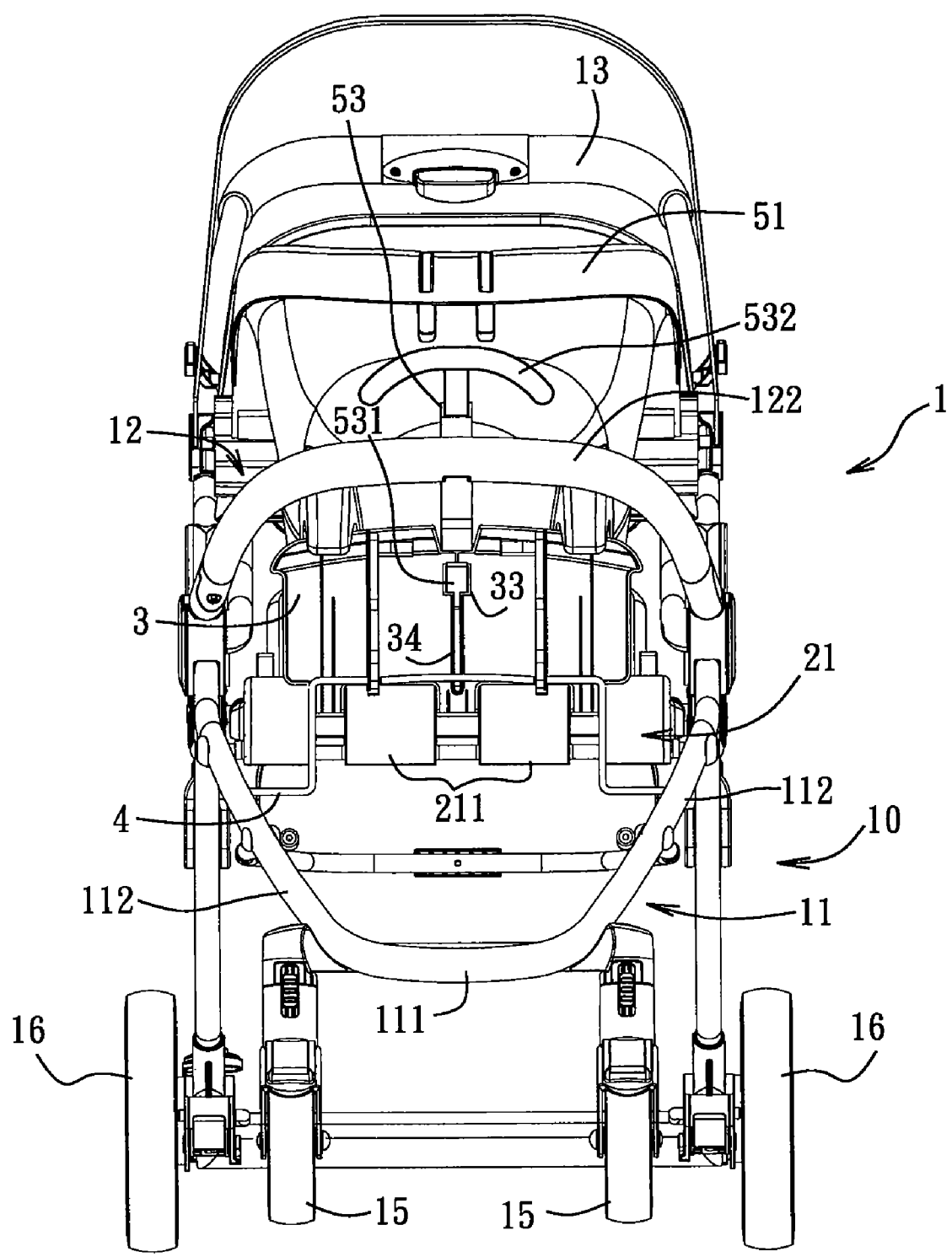
FIG. 4 is a front view of the preferred embodiment.
Figure 5:
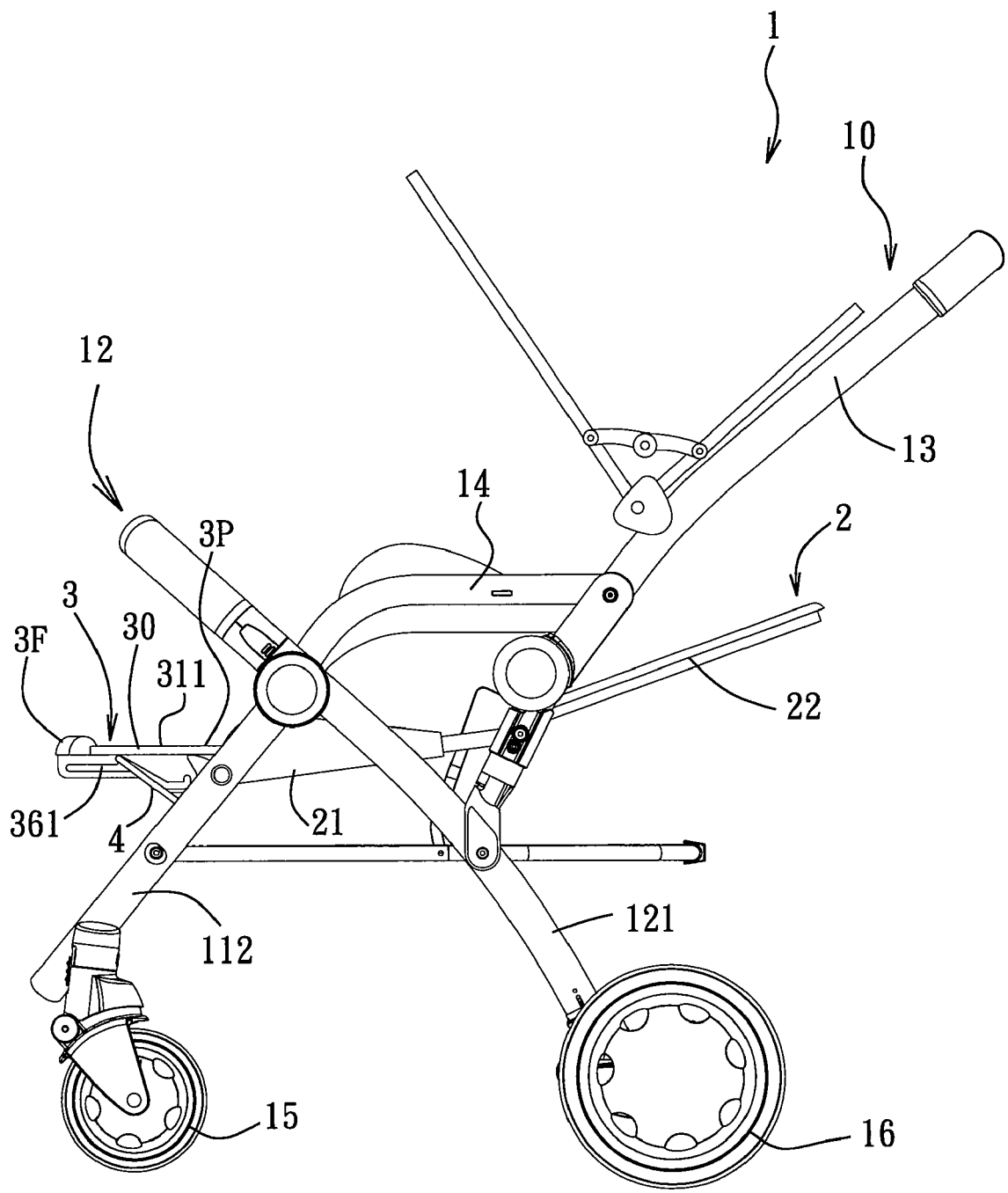
FIG. 5 is a side view of the first preferred embodiment when the footrest disposed in a second position.

With further reference to FIGS. 3, 4, and 5, the footrest 3 includes a plate body 30 that has a top surface 311 and a bottom surface 312 when the footrest 3 is disposed in the second position. That is, the bottom surface 312 faces downwardly and the top surface 311 faces upwardly when the footrest 3 is disposed in the second position. The plate body 30 is formed with a plurality of pivot lug units 31 disposed respectively within the lug-accommodating spaces 214. Each of the pivot lug units 31 is C-shaped, and is sleeved rotatably on the corresponding connecting section 213. As such, the footrest 3 has a pivot end (3P) proximate to the pivot lug units 31, and a free end (3F) distal from the pivot lug units 31. The plate body 30 has a coupling portion configured as a retaining groove 33 formed therethrough. In this embodiment, the retaining groove 33 has an elongated extension portion 34 (see FIG. 3) extending from a middle portion thereof toward the pivot end (3P).

The footrest 3 further includes two supporting ribs 35 formed integrally with the bottom surface 312 of the plate body 30 and located respectively to two sides of the retaining groove 33. Each of the supporting ribs 35 extends along a front-to-rear direction, and has first, second, and third positioning portions 362, 363, 364. In this embodiment, each of the supporting ribs 35 is formed with a guide slot 361 extending along a longitudinal direction thereof. Each of the first, second, and third positioning portions 362, 363, 364 is configured as a portion of the guide slot 361. With additional reference to FIG. 6, the first and third positioning portions 362, 364 are disposed respectively in proximity to the pivot end (3P) and the free end (3F) of the guide slot 361. The second positioning portion 363 is disposed between the pivot end (3P) and the free end (3F) (i.e., between the first and third positioning portions 362, 364), and is configured as a branch of the guide slot 361, as shown in FIG. 3.

The supporting rod 4 is disposed under the footrest 3, and has a positioning rod section 41 extending through the guide slots 361 in the supporting ribs 35 and engageable with the first, second, and third positioning portions 362, 363, 364 so as to maintain the footrest 3 in the first, second, and third positions, respectively, and two side rod sections 42 extending in the same direction respectively from two opposite ends of the positioning rod section 41. An assembly of the positioning rod section 41 and the side rod sections 42 is generally U-shaped. The supporting rod 4 further has two pivot rod sections 43 that extend respectively from the side rod sections 42 away from the positioning rod portion 41 and that are connected respectively and pivotally to the front leg side rods 112 of the stroller frame 10.

As such, when the footrest 3 pivots relative to the seat plate 21, the supporting rod 4 moves within the guide slots 361.

Figure 7:
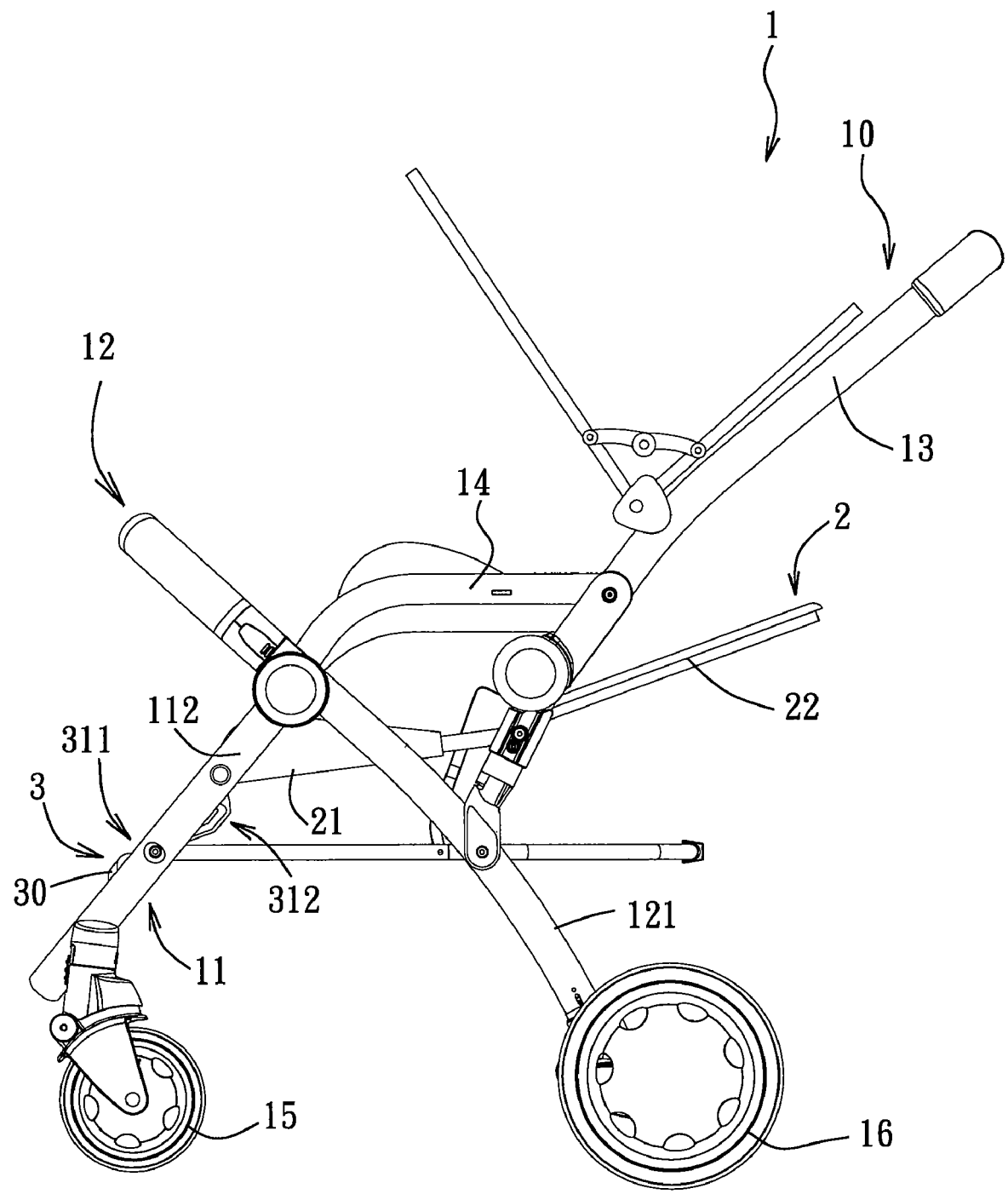
FIG. 7 is a side view of the preferred embodiment when the footrest is disposed in a third position.

With particular reference to FIGS. 5 and 6, when the footrest 3 is disposed in the second position, it is generally horizontal, and is aligned with the seat plate 21. In this state, the baby can sit on the seat portion 2 and rest his or her feet and calves in a generally horizontal position on the top surface 311 of the footrest 3. With particular reference to FIG. 7, when the footrest 3 is disposed in the third position, it is aligned with the front leg side rods 112, and the top surface 311 of the footrest 3 is inclined rearwardly and upwardly. In this state, the baby can sit on the seat portion 2 and rest his or her feet and calves in an inclined position on the top surface 311 of the footrest 3.

With particular reference to FIGS. 2 and 3, when it is desired to mount the car seat 5 to the stroller frame 10, the footrest 3 is pivoted upwardly to the first position such that it stands on the seat plate 21, and the supporting rod 4 is moved to the first positioning portions 362 of the supporting ribs 35 so as to maintain the footrest 3 in the first position. Subsequently, the car seat 5 is moved onto the stroller frame 10 such that the concaved portions 522 engage respectively two opposite sides of the free end (3F) of the footrest 3 and the retaining member 531 engages the retaining groove 33 in the footrest 3. As such, a front end of the car seat 5 is supported by the transverse supporting plate 3, and two opposite sides of the seat body 51 abut respectively against the armrests 14. In this state, when the baby is received within the car seat 5, it faces the back frame 13 and the person pushing the stroller assembly 1.

To remove the car seat 5 from the stroller frame 10, it is only necessary to pull the actuator 532 upwardly so as to disengage the retaining member 531 from the retaining groove 33.

With this invention thus explained, it is apparent that numerous modifications and variations can be made without departing from the scope and spirit of this invention. It is therefore intended that this invention be limited only as indicated by the appended claims.

We claim:

1. A stroller connectable with a car seat with a retaining member, said stroller comprising:
   a stroller frame;
   a seat portion positioned on said stroller frame and including a generally horizontal seat plate; and
   a footrest pivotally positioned on said seat plate and including a coupling portion, said footrest being pivotable relative to said seat plate between a first position and a second position, said footrest standing on said seat plate such that the retaining member engages said coupling portion to thereby retain the car seat on said stroller when said footrest is positioned in said first position.

2. The stroller as claimed in claim 1, further comprising:
   a supporting rod pivotally secured on said stroller frame and under said footrest;
   said footrest including:
   a pivot end connected pivotally to said seat plate;
   a free end opposite to said pivot end;
   a plate body having a bottom surface;
   a first positioning portion positioned in proximity to said pivot end and said bottom surface; and
   a second positioning portion positioned in proximity to said free end and said bottom surface, said bottom surface facing downwardly when said footrest is in said second position;
   wherein when said footrest is positioned in said first position said supporting rod engages said first positioning portion so as to maintain said footrest in said first position, and when said footrest is positioned in said second position said supporting rod engages said second positioning portion so as to maintain said footrest in said second position.

3. The stroller as claimed in claim 2,
wherein when said footrest is positioned in said second position, said footrest is generally horizontal and is aligned with said seat plate;
said footrest further includes a third positioning portion positioned at said plate body such that said second positioning portion is positioned between said first and third positioning portions, and
wherein said footrest is further pivotable to a third position whereat said free end of said footrest is positioned under said seat plate and whereat said supporting rod engages said third positioning portion.

4. The stroller as claimed in claim 3, wherein said footrest includes at least one supporting rib formed integrally with said bottom surface of said plate body and extending along a front-to-rear direction of the stroller, said supporting rib including a guide slot extending along a longitudinal direction thereof, each of said first, second, and third positioning portions being configured as a portion of said guide slot.

5. The stroller as claimed in claim 2, wherein said stroller frame includes a front leg frame and a rear foot frame, said front leg frame including two front leg side rods spaced apart from each other, said seat plate and said supporting rod being positioned between said two front leg side rods.

6. The stroller as claimed in claim 2, wherein said supporting rod includes:
a positioning rod section extending through said footrest and engageable with said first and second positioning portions, and two side rod sections extending respectively from two opposite ends of said positioning rod section such that an assembly of said positioning rod section and said side rod sections is generally U-shaped; and
two pivot rod sections extending respectively from said side rod sections away from said positioning rod section and pivotally connected respectively to two opposite sides of said stroller frame.

7. The stroller as claimed in claim 1, wherein said coupling portion of said footrest is configured as a retaining groove formed through said footrest.

8. A stroller assembly comprising:
a car seat including a seat body including a bottom portion comprising a retaining member; and
a stroller including:
a stroller frame;
a seat portion positioned on said stroller frame and including a generally horizontal seat plate; and
a footrest positioned pivotally on said seat plate and including a coupling portion, said footrest being pivotable relative to said seat plate between a first position and a second position, said footrest standing on said seat plate such that said retaining member engages said coupling portion to thereby retain said car seat on said stroller when said footrest is in said first position.

9. The stroller assembly as claimed in claim 8, further comprising:
a supporting rod pivotally positioned on said stroller frame and under said footrest;
said footrest including:
a pivot end connected pivotally to said seat plate;
a free end positioned opposite to said pivot end;
a plate body having a bottom surface;
a first positioning portion positioned in proximity to said pivot end and said bottom surface; and
a second positioning portion positioned in proximity to said free end and said bottom surface,
wherein when said footrest is positioned in said first position said supporting rod engages said first positioning portion so as to maintain said footrest in said first position, and when said footrest is positioned in said second position said supporting rod engages said second positioning portion so as to maintain said footrest in said second position.

10. The stroller assembly as claimed in claim 9, wherein when said footrest is positioned in said second position said footrest is generally horizontal and is aligned with said seat plate; and
said footrest further includes a third positioning portion positioned at said plate body and in front of said second positioning portion,
wherein said footrest is further pivotable to a third position whereat said free end of said footrest is positioned under said seat plate and whereat said supporting rod engages said third positioning portion.

11. The stroller assembly is claimed in claim 10, wherein said footrest includes at least one supporting rib formed integrally with said bottom surface of said plate body and extending along a front-to-rear direction of the stroller, said supporting rib including a guide slot extending along a longitudinal direction thereof, each of said first, second, and third positioning portions being configured as a portion of said guide slot.

12. The stroller assembly as claimed in claim 9, wherein said stroller frame includes a front leg frame and a rear foot frame; and
said front leg frame includes two front leg side rods spaced apart from each other, said seat plate and said supporting rod being positioned between said two front leg side rods.

13. The stroller assembly as claimed in claim 9, wherein said supporting rod includes:
a positioning rod section extending through said footrest and engageable with said first and second positioning portions; and
two side rod sections extending respectively from two opposite ends of said positioning rod section such that an assembly of said positioning rod section and said side rod sections is generally U-shaped;
said supporting rod further including two pivot rod sections extending respectively from said side rod sections away from said positioning rod section and respectively connected pivotally to two opposite sides of said stroller frame.

14. The stroller assembly as claimed in claim 8, wherein said retaining member is configured as a projecting block, and said coupling portion of said footrest is configured as a retaining groove formed through said footrest.

15. The stroller assembly as claimed in claim 8, wherein said car seat further includes two side ridge walls flanking said retaining member, each wall of said side ridge walls including a concaved portion aligned horizontally with said retaining member; and
said footrest includes a free end, two opposite sides of the free end engaging respectively said concave portions of said car seat for supporting a front end of said car seat when said car seat is assembled to said stroller frame.

16. A stroller assembly comprising:
a car seat including a retaining member;
a stroller frame including a front leg frame and a rear leg frame;
a seat portion positioned on said stroller frame and formed with a generally horizontal seat plate;
a plate body including:
  a pivot end connected pivotally to said seat plate such that said plate body is pivotable relative to said stroller frame between a first position and a second position,
  a free end opposite to said pivot end, and
  a coupling portion positioned between said pivot end and said free end such that when said plate body is positioned in said first position said free end is positioned above said pivot end; and
  said retaining member of said car seat engages said coupling portion so as to retain said car seat on said stroller frame.

17. The stroller assembly as claimed in claim 16, wherein said plate body serves as a footrest when in said second position, said free end being pivoted downwardly relative to said stroller frame when said plate body is pivoted from said first position to said second position.

18. The stroller assembly as claimed in claim 16, further comprising a transverse positioning rod positioned pivotally on said front leg frame, said coupling portion being configured as a retaining groove formed through said plate body.

19. A stroller for removable securing a car seat including a retaining member, said stroller comprising:
a stroller frame including a front leg frame and a rear leg frame;
a seat portion positioned on said stroller frame and formed with a generally horizontal seat plate; and
a plate body including:
  a pivot end pivotally connected to said seat plate such that said plate body is pivotable relative to said stroller frame between a first position and second position;
  a free end opposite to said pivot end; and
  a coupling portion positioned between said pivot end and said free end;
wherein when said plate body is positioned in said first position, said free end is positioned above said pivot end such that the retaining member of the car seat engages said coupling portion to thereby retain the car seat on said stroller frame.

20. The stroller as claimed in claim 19, wherein said free end is pivoted downwardly so that said plate body serves as a footrest when said plate body is in said second position.

21. The stroller as claimed in claim 20 further comprising:
a supporting rod pivotally positioned on said front leg frame;
said plate body further including a first positioning portion positioned in proximity to said pivot end, and a second positioning portion positioned in proximity to said free end,
wherein when said plate body is positioned in said first position, said supporting rod engages said first positioning portion so as to maintain said footrest in said first position, and when said plate body is positioned in said second position, said supporting rod engages second positioning portion so as to maintain said footrest in said second position.

* * * * *